J. Baldwin.

Shuttle.

No. 710. Reissued May 3, 1859.

N. PETERS, PHOTO-LITHOGRAPHER, WASHINGTON, D. C.

UNITED STATES PATENT OFFICE.

JAMES BALDWIN, OF NASHUA, NEW HAMPSHIRE.

IMPROVEMENT IN SHUTTLES FOR WEAVING CLOTH.

Specification forming part of Letters Patent No. 1,485, dated January 31, 1840; extended for 7 years from January 31, 1854; Reissue No. 710, dated May 3, 1859.

*To all whom it may concern:*

Be it known that I, JAMES BALDWIN, of Nashua, in the county of Hillsborough and State of New Hampshire, have invented a new and useful Improvement in the Shuttle for Weaving Cloth; and I do hereby declare that the following is a full and exact description thereof.

In the description of said invention reference is had to the accompanying drawings, which are made a part of this specification.

Figure 1:
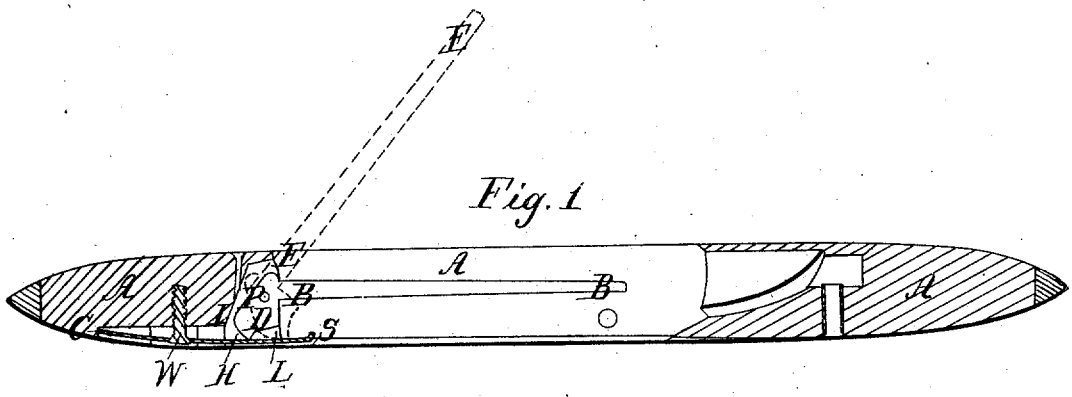
Figure 3:
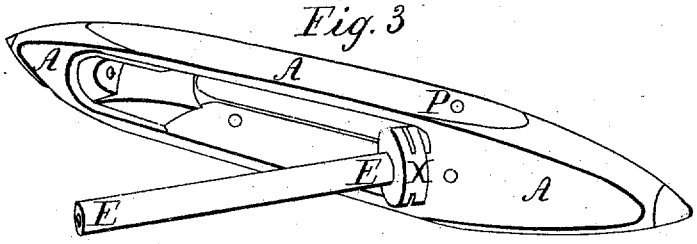
Figure 2:
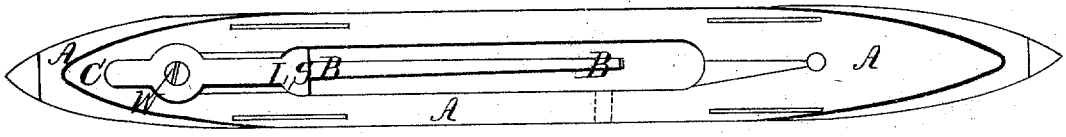

In Figures 1, 2, and 3, A A A is the body of the shuttle, Fig 1 being a longitudinal section of the shuttle, Fig. 2 a view of the bottom of the shuttle, and Fig. 3 a perspective view.

In Figs. 1 and 2, B B is the spindle on which the bobbin is placed in the position which it occupies when turned down into the mouth of the shuttle, being occupied by the spindle when the bobbin is placed in the shuttle and the shuttle is in operation in the loom. This spindle plays or turns on the pin P, which passes through the body of the shuttle, Figs. 1 and 3, and through the head D, Fig 1, of the spindle.

In Fig. 3, E E represents the spindle turned up out of the mouth of the shuttle, in the position to receive the bobbin, and the bobbin placed upon it.

Figure 4:
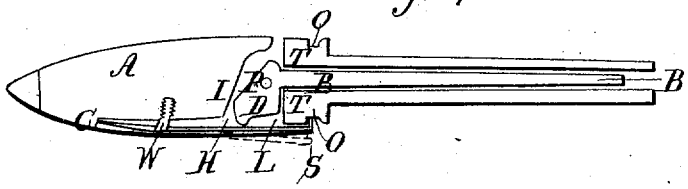

In Figs. 1 and 2, C S is a steel spring let into the body of the shuttle on its under side, as shown in Fig. 1, and confined to the body of the shuttle by means of the screw W, Figs. 1 and 2, and this spring presses against the head D, Fig. 1, of the spindle at the point H, forcing up the rounded end H of the head of the spindle against the body of the shuttle at I, and holding the spindle firmly in its place when turned down into the mouth of the shuttle, and preventing it from playing loosely on the pin P. The dotted lines E in Fig. 1 indicate the position of the spindle when turned up out of the mouth of the shuttle for the purpose of receiving the bobbin. The bobbin, being placed upon the spindle, is turned down into the mouth of the shuttle, the head D of the spindle revolving on the pin P, from the position indicated by the dotted lines, until the rounded end of the head strikes against the body of the shuttle at I, the body of the shuttle being dug out or hollowed out so as to receive the head of the spindle and admit of its thus turning on the pin. The end L S, Figs. 1 and 2, of the spring projects into the mouth of the shuttle, and at the end S the spring is turned up into the mouth of the shuttle so as to form a short lip or catch in the same manner as on the end of the catch in the shuttles in common use. The part L S, Figs. 1 and 2, of the spring which projects into the mouth of the shuttle is of such length that when the bobbin is placed on the spindle, and the spindle is turned down, the head of the bobbin is admitted as the spindle is turning down to pass in between the lip or catch S, Fig. 1, and the head D of the spindle, and the head of the bobbin, striking against the lip or catch S, is thus prevented from sliding on the spindle when it is turned down into the mouth of the shuttle. The head of the bobbin is shown at X, Fig. 3, and the head may be constructed with a groove, as there represented, into which the lip or catch S, Fig. 1, will pass as the bobbin is turned down into the shuttle, and thus confine it on the spindle. In Fig. 4, which is a longitudinal section of the spindle with the bobbin upon it in the position which they occupy when turned down into the shuttle, is shown the manner in which the bobbin is thus confined, T T being the head of the bobbin with a groove therein at O O, and the lip S on the end of the spring projecting into the groove.

The spindle being in the position represented by the dotted lines E E, Fig. 1, ready to receive the bobbin, it is placed upon the spindle by the operative, and as it is turned down into the mouth of the shuttle, the bobbin being pressed down against the head D of the spindle, the lower edge of the head of the bobbin passes inside of the lip or catch S, so that the lip or catch S shuts into the groove when the bobbin is turned entirely down into the mouth of the shuttle, as is represented in Fig. 4, and the bobbin is confined in its place.

When it is desired to take the bobbin from the spindle, the spindle is turned up out of the mouth of the shuttle, and, as it rises, the rounded end H of the head of the spindle is turned down and forces down the spring into the position indicated by the dotted lines in Fig. 4, the lip or catch S being carried down by the same motion, so as to uncover the head of the bobbin or so as to withdraw itself from the groove O O, Fig. 4, and admit of the bobbin being taken from the spindle.

The nature of my invention consists in furnishing the shuttle with such a spindle, spring, and catch as will admit of the four conditions or particulars following, to wit: First, that the spring and catch be made of one piece, thereby avoiding the expense of separate catches and springs, and of fastening them separately to the body of the shuttle, as in the common shuttle, and as in all other shuttles now in use; second, that the said catch be fastened to the body of the shuttle by means of a screw, instead of playing upon a pin, as is the case in all shuttles now in use, and as must necessarily be the case where the spring and catch are made up of separate pieces, thereby avoiding the very great inconvenience occasioned by the said pin on which the catch in the common shuttle plays wearing into the body of the shuttle and working loose so as to render the thread liable to slip in between said catch and the body of the shuttle and break; third, that said spring and catch be so constructed and arranged as that by turning down the spindle with the bobbin upon it into the mouth of the shuttle the bobbin fastens or secures itself, and by turning up the spindle with the bobbin upon it out of the mouth of the shuttle the bobbin is released without any other operation, thereby avoiding the inconvenience experienced in the use of all shuttles heretofore constructed or used of pressing down the catch with one hand, either for the purpose of taking off or putting on the bobbin while the spindle is turned with the other hand; fourth, that the head of the spindle be so constructed and the spindle and spring so arranged as that the spring shall press against that part of the head of the spindle which is back of the pin on which the spindle plays, instead of that part which is forward of said pin, as in the common shuttle, and thereby admit of having that part of the head of the spindle which comes in contact with the spring rounded off, instead of having it a square or sharp corner, as in the common shuttle, thus diminishing the friction, and consequently diminishing the liability of the head of the spindle to wear off, and also thus rendering the shuttle fit for use after the head of the spindle has become worn to a degree which, in the case of the common shuttle, would render it unfit for use.

What I claim, and desire to secure by Letters Patent, is—

Furnishing the shuttle with a spring and catch so arranged that the bobbin will be received or released at one operation, substantially as described.

In testimony whereof I have hereunto signed my name before two witnesses.

JAMES BALDWIN.

Witnesses:
GEO. Y. SAWYER,
JOHN E. EARLE.